J. H. BAIR.
LUBRICATION OF INTERNAL COMBUSTION ROTARY ENGINES.
APPLICATION FILED APR. 30, 1919.
1,326,833.
Patented Dec. 30, 1919.
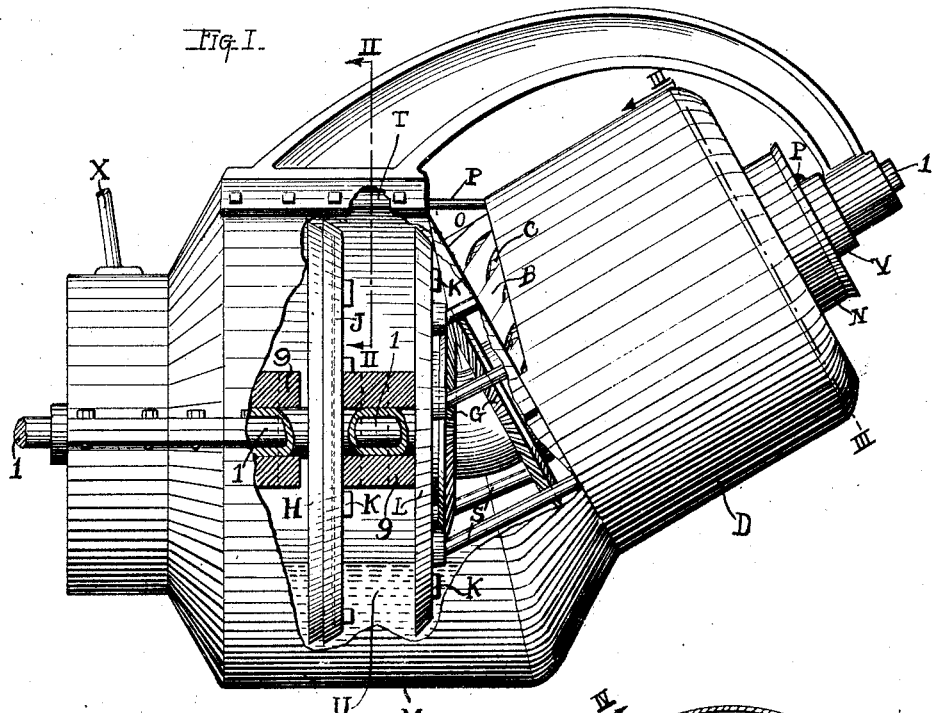
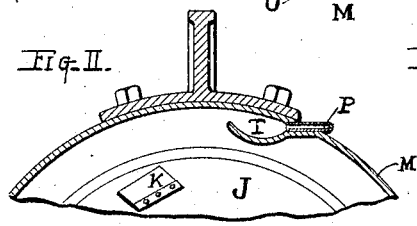
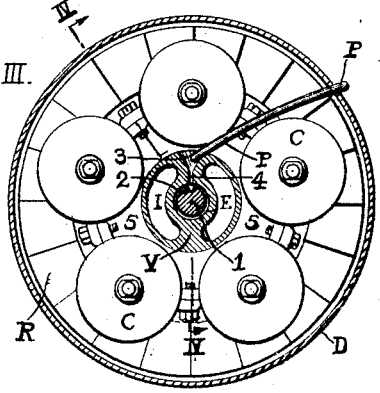
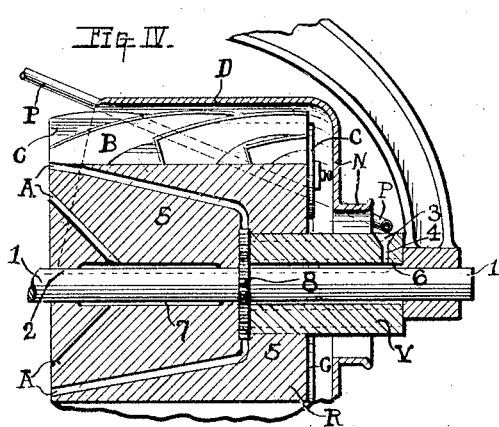
INVENTOR.
Joseph H. Bair
BY
Augustus B. Stoughton
ATTORNEY.

UNITED STATES PATENT OFFICE.

JOSEPH H. BAIR, OF HADDONFIELD, NEW JERSEY.

LUBRICATION OF INTERNAL-COMBUSTION ROTARY ENGINES.

1,326,833.     Specification of Letters Patent.     Patented Dec. 30, 1919.

Application filed April 30, 1919. Serial No. 293,716.

*To all whom it may concern:*

Be it known that I, JOSEPH H. BAIR, a citizen of the United States, residing at Haddonfield, in the county of Camden and State of New Jersey, have invented certain new and useful Improvements in the Lubrication of Internal-Combustion Rotary Engines, of which the following is a specification.

My invention relates to an automatic system of oiling of a rotary engine of the class where the cylinders are parallel with their axis of rotation, which is inclined to the axis of the driven member. This is a form of splash system, in combination with a gravity system. The driven member consists of a thrust disk with ball and socket joints to connect the pitman rods therewith, and a cone clutch disk. These disks dip into the oil in a sump and by means of rotation and deflectors on the face of the disks the oil is thrown upon the working parts, up into the cylinders and into a trough at the top of the inclosure casing from which it flows by means of a gravity pipe out into a reservoir at the forward, uptilted end of the shaft of rotation. From this reservoir it leaks through a passage into a groove on top of the inclined shaft down which it flows and furnishes lubricant for valves, gears and bearings along its path on the shaft until it finally reaches again the sump. On account of the centrifugal action of the rotor the oil flowing down the shaft from the reservoir tends to be thrown radially outward. On this account the valve, the timing gears and the bearings are throughout supplied with lubricant, but to avoid flooding and a stagnant condition I provide oblique canals leading from the central chamber of rotation to the rear (or sump) end of the rotor where the oil is expelled by means of the suction thus produced due to the speed of rotation.

Referring to the drawings—

Figure I, is an elevation of the complete engine with a portion of the casing broken away and the bearing supports in section.

Fig. II, is a fragmentary section on the line II—II of Fig. I, to show the trough and canal entrance of the gravity system.

Fig. III, is a cross section on the line III—III of Fig. I, showing the delivery end of the gravity line from the trough, the receiving reservoir and its outlet connection in section, and the oil conveying groove in the shaft of rotation.

Fig. IV, is a longitudinal section on the line IV—IV, of Fig. III. This section is made midway between adjacent cylinders on the line where their flush faces join. In one of each pair of these union faces are oblique grooves leading from the central chamber of rotation outward to the rear.

1, is a bent shaft of rotation upon the uptilted end of which is mounted the rotor R, carrying the cylinders C. On the horizontal end is mounted the driven member consisting of the thrust disk L, and the female clutch member J, rigid therewith by a common sleeve, and a male clutch member H, with sleeve which is controlled by a lever X. These respective sleeves of the driven members are intermedate the shaft 1, upon which they are mounted and supports 9, serving as a bearing. On the members J and I, are oblique deflectors K, which throw the oil U, up and out in the direction of the rotor. The supports 9, span across from one side of the casing M, to the other.

The rotor R, is covered with a bottle shaped sleeve D, with a neck N, which is open around the valve V, to admit air. There is also a semi-circular opening O, above where this cover D, joins the casing M. This opening is for the exhaust of hot air produced by the blower action of the spiral blades on the rotor (application for Letters Patent for which has been filed separately).

The oiling system herein claimed briefly described constitutes first an inclined rotor having cylinders thereon parallel with the axis of rotation, and having the open end thereof by means of which the pistons coöperate with the driven member by means of connecting rods S, downward; second, driven members on a horizontal shaft consisting of thrust disk L, and clutch disks H and J, thirdly, a housing or cover consisting of the main housing M, which provides an oil sump U, for the disks just named to run in, and an up-tilted bottle shaped cover D—N, conforming to the rotor R; fourthly, a trough T, to receive some of the oil thrown up by the disks and a conduit P, connected with the trough to convey the oil forward by gravity and discharge it into a bowl 3, in the valve V, at the forward, highest end of axle 1, and finally, a channel 2, on the top of inclined axle 1, receiving the oil from bowl 3, by an outlet 4. This oil flowing down the shaft lubricating the working parts tends by the centrifugal action of the rotor to be thrown radially outward thus oiling the gears 8, and the valve V. This centrifugal action tends to flood the valve V, and the cavity 6, affording play between it and shaft 1, and also the cavity 7, between the rotor bearings. To prevent this and to keep the oil active and in circulation, oblique ducts A, in the metal part 5, between adjacent cylinders C, are provided. These ducts connect with the central axial cavity and terminate in the rear at the end of the rotor R. The rapid turning of the rotor produces considerable suction pressure and assures active circulation of the lubricating oil and a return thereof to the sump U. Any oil which may leak out from the rotor is caught in the sleeve D—N, and by means of its incline drains back into the sump. The gears G, connecting driver and driven members by means of the bend in the shaft 1, are also assured sufficient oiling by means of the deflectors K, the spouting from the canals A, and the draining from the cylinders C, by means of their incline and the reciprocating movement of their pistons.

I claim:

1. A rotary internal combustion engine having in combination an uptilted rotor, an inclined rotor shaft, cylinder elements carried by the rotor, a casing having an oil reservoir at its lower part and an oil trough at its upper part, a gravity feed from the trough for the rotor, and a driven member coöperating with the oil reservoir to splash oil into the trough and for lubricating the cylinder elements, substantially as described.

2. A rotary internal combustion engine having in combination an uptilted rotor, an inclined rotor shaft, cylinder elements carried by the rotor, a casing having an oil reservoir at its lower part and an oil trough at its upper part, a gravity feed from the trough for the rotor, a driven member coöperating with the oil reservoir to splash oil into the trough and for lubricating the cylinder elements, and a sleeve having a neck and constituting a continuation of the oil reservoir and inclosing the rotor.

3. A rotary internal combustion engine having in combination an inclined rotor shaft, an uptilted rotor mounted on the shaft and provided with suction canals, a casing having an oil reservoir at its lower part and an oil trough at its upper part, a gravity feed from the trough to the shaft, and a driven member coöperating with the oil reservoir and the trough, substantially as described.

JOSEPH H. BAIR.